United States Patent [19]

Janigian

[11] Patent Number: 5,303,149
[45] Date of Patent: Apr. 12, 1994

[54] SYSTEM FOR ELIMINATING DUPLICATE ENTRIES FROM A MAILING LIST

[76] Inventor: Paul C. Janigian, 8007 Carroll Ave., Takoma Park, Md. 20912

[21] Appl. No.: 783,119

[22] Filed: Oct. 28, 1991

Related U.S. Application Data

[62] Division of Ser. No. 431,184, Nov. 3, 1989, Pat. No. 5,111,395.

[51] Int. Cl.⁵ ............................................. G06F 15/21
[52] U.S. Cl. .................................. 364/408; 340/825.3
[58] Field of Search ......................... 364/401, 408, 570; 340/825.3

[56] References Cited

U.S. PATENT DOCUMENTS

| | | | |
|---|---|---|---|
| 4,641,239 | 2/1987 | Takesako | 235/380 |
| 4,800,582 | 1/1989 | D'Agosto, III et al. | 379/216 |
| 4,853,882 | 8/1989 | Marshall | 364/401 |
| 4,989,144 | 1/1991 | Barnett, III | 364/419 |
| 5,111,395 | 5/1992 | Smith et al. | 364/408 |

Primary Examiner—Gail C. Hayes
Attorney, Agent, or Firm—Lalos & Keegan

[57] ABSTRACT

Contributor/customer lists are created with a merge/purge program that identifies duplicate records even though key elements of the records (e.g. name/address or zip code) differ.

8 Claims, 6 Drawing Sheets

SYSTEM FOR ELIMINATING DUPLICATE ENTRIES FROM A MAILING LIST

This application is a division of U.S. patent application Ser. No. 431,184 filed Nov. 3, 1989, now U.S. Pat. No. 5,111,395.

BACKGROUND OF THE INVENTION

The present invention is related to systems for raising and collecting funds (e.g. contributions for fund raising programs, magazine sales, book clubs, record clubs, etc.). Traditionally, funds are collected by soliciting (i.e. through mail, telephone, or personal contact) probable or possible contributors or customers in an effort to obtain a one-time donation or single sale. Future donations or sales usually require additional solicitations. Lists of possible contributors or customers are generated from a variety of sources. Such sources include organization membership directories, personal references, contributor lists from related or prior fund raising events, customer sales lists from other magazines or book clubs, etc. These traditional fund raising methods have certain disadvantages. Contributors or existing customers must be recontacted each time a new contribution or future sale is requested. This is time-consuming, costly, and possibly counter-productive if contributors or customers feel bothered by repeat solicitations. Duplicate solicitation, which often offends contributors and customers, is common in traditional fund raising and sales programs because of duplications in contributor and customer lists. Prior art programs for eliminating duplications have been inadequate.

In today's fund raising and sales programs, contributor and customer lists are stored in a computer system on some form of magnetic media, e.g. hard disk, floppy disk or tape. Management of contributor/customer lists is usually performed by a computer program that merges one source of data (e.g. names/addresses of contributors) with another source and then purges duplicate records. Each "record" will normally include both the name and address of one person. Such systems are designed to eliminate a duplicate record only when all data elements of the duplicate match exactly with the data elements of another record.

Key elements of the record are combined to form a matchcode, which is then attached to the original record and carried throughout the merge/purge process. For example, different match codes may include the first 4 characters of the last name, the address number, the first 3 characters of the street name, and the last 2 digits of the zip code. In prior art merge/purge systems a duplicate record is identified only if all elements of each matchcode match exactly. In practice however, these prior art methods fail to detect many duplicate records where a person's name or street name has been misspelled, or a street number or zip code number has been transposed.

SUMMARY OF THE INVENTION

The present invention overcomes the disadvantages of the prior art by providing a method and apparatus whereby repeat solicitations are unnecessary and inadvertent duplicate solicitations are greatly reduced. For the purposes of discussion and easy understanding, the invention will be described in terms of one application of the present invention wherein the purpose of a solicitation is to obtain a contribution for a political campaign. However the present invention is equally applicable to any program in which continuing, periodic payments are desired. For example, the present invention can be used to automatically collect payments from a customer in a book or record club, wherein the customer receives a product periodically (e.g. monthly) and payments are required on the same periodic basis. Such arrangements are of indefinite duration and are terminated only at the request of the customer. It is therefore desirable to have a method whereby entry into the club is simple and payments are made automatically.

In the application of the present invention wherein funds are being raised for a political campaign a "one-time" solicitation letter is sent to each potential contributor. Such letter will include a check in the form of bank draft drawn on the fund raiser's account and made out to the contributor. A bank draft is similar to a simple check except it is payable through the issuing bank and must be approved by the account holder before the draft (check) is honored. The draft must be endorsed by the contributor and is usually deposited into the contributor's own bank account. The contributor, as informed in the solitication letter, by endorsing and depositing the draft, authorizes his own bank to automatically and periodically transfer funds from his account to the fund raiser's account. This authorization can be unilaterally terminated by the contributor once the draft amount has been transferred from their account. This unique method utilizes the computerized electronic banking network to automatically and periodically receive funds from a contributor without further solicitation. The solicitation letter is effectively a proposal to the contributor to enter into an electronic funds transfer agreement and the bank draft provides a simple and effective instrument for accomplishing that result.

In order to avoid sending duplicate solicitation letters and duplicate drafts, the method of the present invention utilizes a novel computer program for creating and managing contributor lists. The program of the present invention performs a series of tests that are designed to identify two records as duplicates even if certain elements of the match codes in the two records do not match exactly (e.g. where the name, address or last two positions of the zip code in either record has been miskeyed).

The full advantages of the present invention will be appreciated by those having ordinary skill in this field in view of the detailed description and accompanying drawings.

DETAILED DESCRIPTION

The present invention combines an automatic contribution or payment program and automated contributor/customer list program to provide a unique fund collection and payment processing method and apparatus. For the sake of simplicity of discussion, the present invention will be described in the terms of one application—fund raising for a political campaign, charity, etc. The present invention utilizes certain existing banking programs including electronic automatic fund withdrawal and transfer programs. Details of the electronic programs in the banking industry are well known and details of such programs are not necessary to an understanding of the present invention. Therefore, banking programs and procedures will be discussed in general terms and only at the level required to understand and appreciate the present invention.

In the present invention, a solicitation letter is mailed to potential contributors using a "duplicate free" contributor list created by the unique merge/purge program of the present invention, discussed later in detail. The solicitation letter will identify the fund raising organization (hereinafter "The Fund Raising Group") and the purpose of the fund (e.g. political campaign, charity, etc.). The solicitation may include certain incentives to the potential contributor, such as printing or publishing the contributor's name along with the names of other contributors who may be famous or influential.

Figure 1:
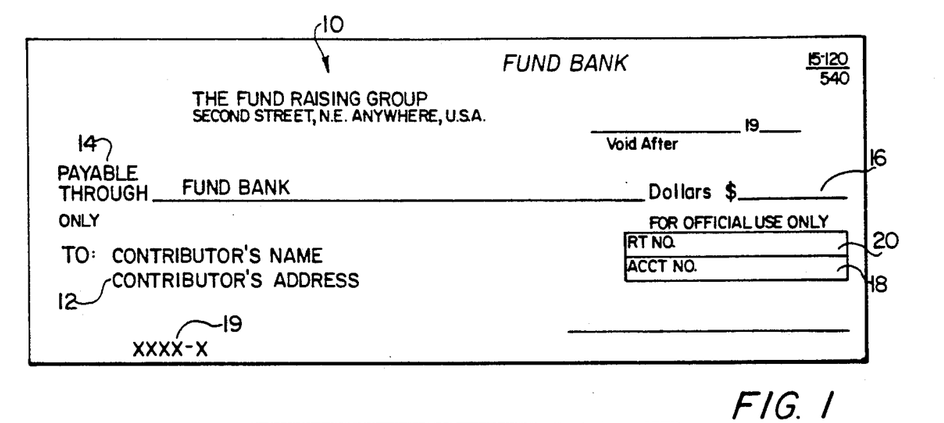
FIG. 1 illustrates a preferred form of the bank draft that is sent to potential contributors (customers).

In any event, the solicitation letter will provide an explanation of the automatic contribution program. In a preferred embodiment, the program includes the step of forwarding, with the solicitation letter, a bank draft 10 (FIGS. 1 and 2) to the potential contributor. The bank draft, as shown in FIG. 1 will be drawn on the Fund Raising Group's bank account at the Fund Raising Group's bank (hereinafter "Fund Bank"). The draft will be made out to the contributor with the contributor's name and address 12 printed on the draft. The name and address will be derived from the contributor list created by the merge/purge program of the present invention. As will be appreciated, it is very important that duplicate names be eliminated from such list to avoid the issuance of duplicate drafts.

As distinct from a simple check, the draft 10 is payable only through the Fund Raising Group's bank as indicated at 14. As the drafts are presented to the Fund Bank for payment, the bank notifies the Fund Raising Group. These drafts can then be inspected by the Group and either accepted or dishonored. If accepted, the amount 16 (FIG. 1) that will be printed on the draft will be debited from the Group's account. Since a draft is sent to each potential contributor, it is very important in the present invention that the contributor list be accurate and not contain duplicate names.

Certain information about each contributor, in addition to his/her name and address, must be known before the bank draft is issued and mailed to the contributor. This information includes the contributor's bank account number 18 (FIG. 1) and the routing number 20 of the contributor's bank. The routing number 20 identifies the particular bank and branch. This information can be obtained from checks previously sent from the contributor to the Fund Raising Group. To maintain the confidential nature of this information, the account and routing numbers printed on the draft can be an encoded or encrypted version of the actual numbers. One simple encoding technique is to print the radix-minus-one complement of the actual numbers on the check. For example, if the account number was 624-725-1, the encoded number printed on the draft would be 375-274-8 (i.e. 9,999,999−6,247,251). Another method for maintaining the confidentiality of the account and routing numbers is to assign a unique control number 19 (FIG. 1) to each contributor's account and bank routing numbers. Then, only the control number is printed on the draft (or check). When the draft is presented for payment, the contributor's account and bank routing number can then be identified by the control number 19 printed on the draft 10.

In order to cash the draft, the customer must agree to certain conditions presented by Fund Raising Group. These conditions, which relate to automatic preauthorized funds transfer, can be explained in detail in the solicitation letter. As an example, the draft amount can equal twenty dollars. As a condition for cashing the check (draft), the contributor must authorize his bank to charge his account for at least each of the next two months one half (i.e. ten dollars) of the amount on the face of the check (draft). The contributor makes this agreement when he endorses the back of the check (FIG. 2) as shown at 22. Further details of the agreement between the contributor and the Fund Raising Group can also be printed on the back of the check, as shown for example at 24.

Figure 2:
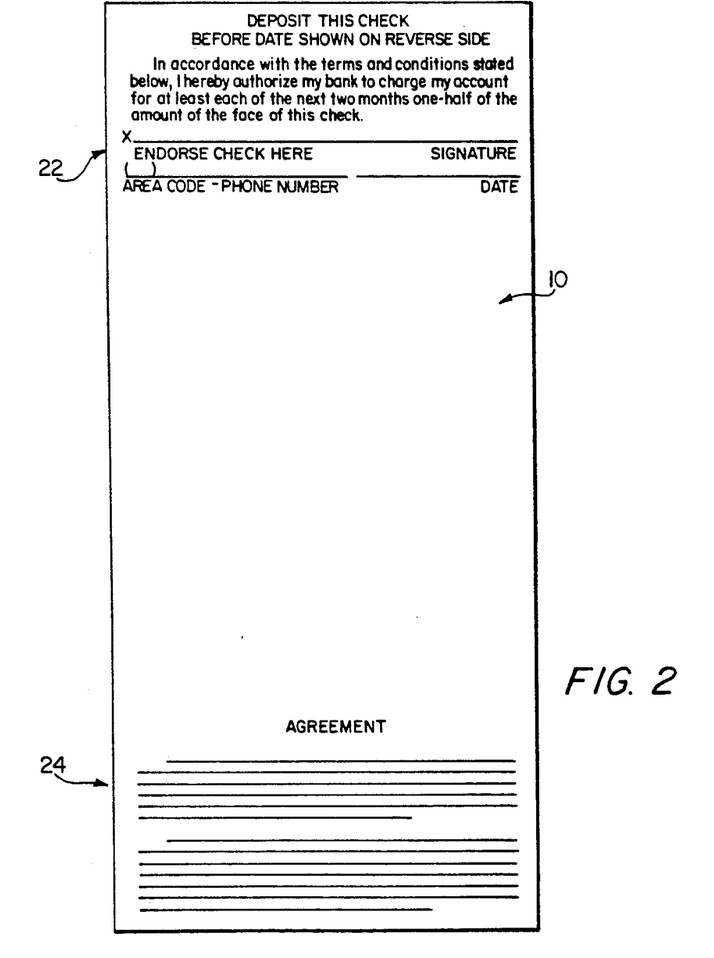
FIG. 2 illustrates a preferred form of the back of the bank draft.

The unique method of the present invention permits an on-going, periodic contribution program to be developed with only a single solicitation. Each month, as authorized by the contributor, the contributor's bank charges his account a fixed amount (e.g. one-half the check amount) and such amount is credited to the Fund Raising Group's account. In the example described above, the contributor makes no actual contribution for the first two months, since the amount of the check, supplied by the Fund Raising Group is equal to the two months' contribution. However, each month thereafter the Group received an actual contribution. The contributor can terminate the agreement and program anytime after the initial two months, i.e. once the Fund Raising Group has retrieved the amount paid to the contributor. If the contributor does not terminate the agreement and stays with the program, an automatic increase in the contribution amount can be contemplated and agreed to. For example, the agreement shown at 24 in FIG. 2 provides that the monthly charge shall increase by ten percent on each twelve month anniversary date of the initial charge.

Figure 3:
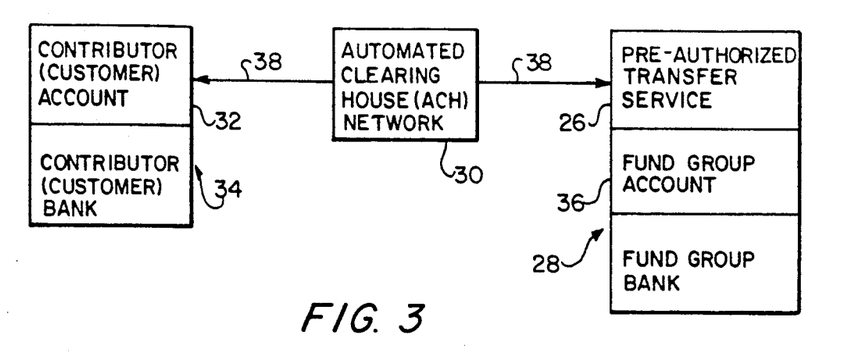
FIG. 3 illustrates generally the electronic funds apparatus utilized by the present invention.

The present invention utilizes existing banking programs and electronic fund transfer apparatus. Details of these conventional programs and apparatus are not necessary for an understanding of the present invention. FIG. 3 illustrates in general block form the apparatus involved. The Fund Raising Group will utilize the Pre-Authorized Transfer service 26 offered at the Group's bank 28. Most major banks, which are members of the Automated Clearing House (ACH) network 30, offer such a service. The Fund Raising Group will provide its bank 28 with the names, addresses, bank account numbers and bank routing numbers of each potential contributor. The Group's bank 28 will then print the drafts as shown in FIGS. 1 and 2. As discussed above, the account and routing numbers may be encoded before printing, or assigned a control number which will be printed rather than the actual account and routing numbers. If such is the case, the encoded numbers or the control number will be decoded when the endorsed drafts are returned for payment. As previously discussed with reference to FIG. 2, endorsement of the draft (check) authorizes periodic debits from the contributor's account 32 (FIG. 3) at the contributor's bank 34. The account 18 and routing 20 numbers on the draft identify the contributor's account 32 and bank 34 to the Group's bank 28. With such information and authorization, the Group's bank 28 can begin making periodic (e.g. monthly) debits from the customers account 32 through the Automated Clearing House Network 30. Such electronic transfers are made over conventional communication lines 38. The debit amounts are automatically credited to the Group's account 36.

Electronic fund transfer is made possible by the computer systems and networks of the banks 28 and 34 and Automated Clearing House 30. A detailed description of these computer systems and the banking system's information exchange network are not necessary to understand or use the present invention. solicitation using the method of the present invention involves the unique bank draft discussed above and the electronic fund transfer systems of the banking industry. This method has several unique advantages. The contributor (or customer in the general case) can enter the program simply by signing a check. No further work is required on the contributor's part or on the part of the fund raiser (or supplier of services/goods in the general case). This makes such a program attractive to the contributor and cost effective to the fund raiser. Since the program is on-going and periodic debits (contributions or payments) are made automatically, repeat solicitations and their associated costs are eliminated.

As will be appreciated, since the present invention involves the transfer of funds, initially drawn on the account of the fund raiser (or supplier of services/goods), it is of critical importance that only one solicitation and bank draft be sent to each potential contributor (or customer). The accuracy of contributor/customer lists is more important in the present invention than in traditional solicitation programs. The solicitation method of the present invention, which relies on accurate contributor (customer) lists, utilizes a unique computer program for creating such lists.

Traditionally, lists of names, addresses, etc. are created by merging (combining) sources of information and then purging (discarding) duplicate entries. In prior art systems, each name/address entry defines a "record", with a plurality of such records being stored in a computer on one or more magnetic media, i.e. hard disk, floppy disk, or tape. Key elements of each record are combined to form a matchcode. A conventional matchcode could include, for example, the first 4 characters of the last name, the address number, the first three characters of the street names, or the zip code. In prior art merge/purge systems, records are considered unique unless the complete matchcode of one record is identical to the complete matchcode of another record. Such systems fail to identify duplicates where common key punching errors occur such as in situations where a name or street has been keyed improperly, a street number or zip code number has been transposed or mistyped, etc.

The present invention is unique since only a few (rather than all) data elements of the records are required to match. The present invention is further unique in that it makes about 25 comparisons between both records searching for similarities, rather than simply comparing one complete matchcode to another. These 25 tests also vary dynamically depending on address type, absence or presence of apartment number, etc. In other words the present invention automatically makes certain trade-off decisions during the actual process depending on the characteristics of the two particular records being tested at that instant.

The improved program of the present invention (hereinafter the "Program", for simplicity) performs a plurality of comparison tests on two records to determine if they identify the same individual. The number and type of tests performed within the Program change dynamically depending on various conditions, such as address type (residential, P.O. Box, etc.), absence or presence of apartment number, etc. In effect, the Program automatically makes decisions as to which tests to perform depending on the characteristics of the two records presently under test.

The Program will recognize duplicate records even if the zip code, name or address do not match exactly because each data element (i.e. portion of the record) is examined individually. If enough of the elements match, a duplicate record can reasonably be assured.

The Program has performed with an accuracy of 98%, or better, and can detect duplicate records even where significant portions of the names and addresses of the two records being compared differ, as the following list illustrates.

1. Quadrants (NW vs., N.W. vs., Northwest)
2. Zip 20016 vs. 20061
3. North Fifth Street vs. N 5th Street
4. Two Dupont Circle vs. 2 Dupont Circle
5. 12-34 Park Road vs. 1234 Park Road
6. O Neil vs. O'Neil
7. Mac Donald vs. MacDonald
8. Luca vs. de Luca
9. Phiffer vs. Fiffer
10. Goldschmidt vs. Goldsmith
11. Smith-Jones vs. Jones
12. 123 Park Rd vs. 128 Park Rd
13. Route 2, Box 33 vs. RR2 PO Box 38

Figure 4:
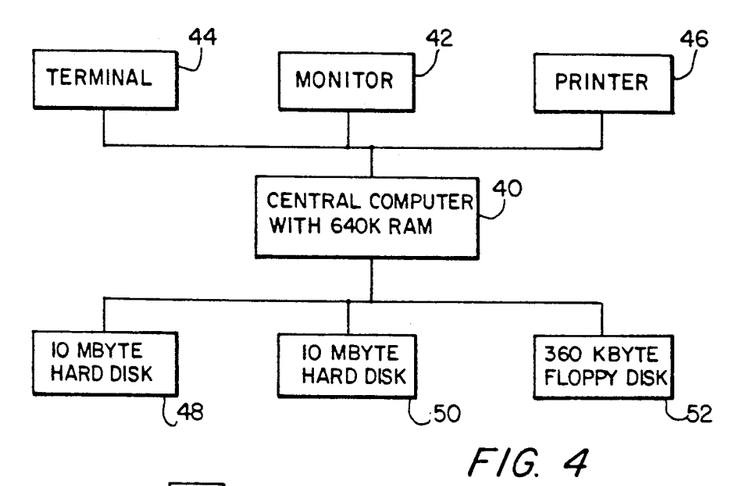
FIG. 4 illustrates generally the computer equipment utilized by the present invention.
Figure 5:
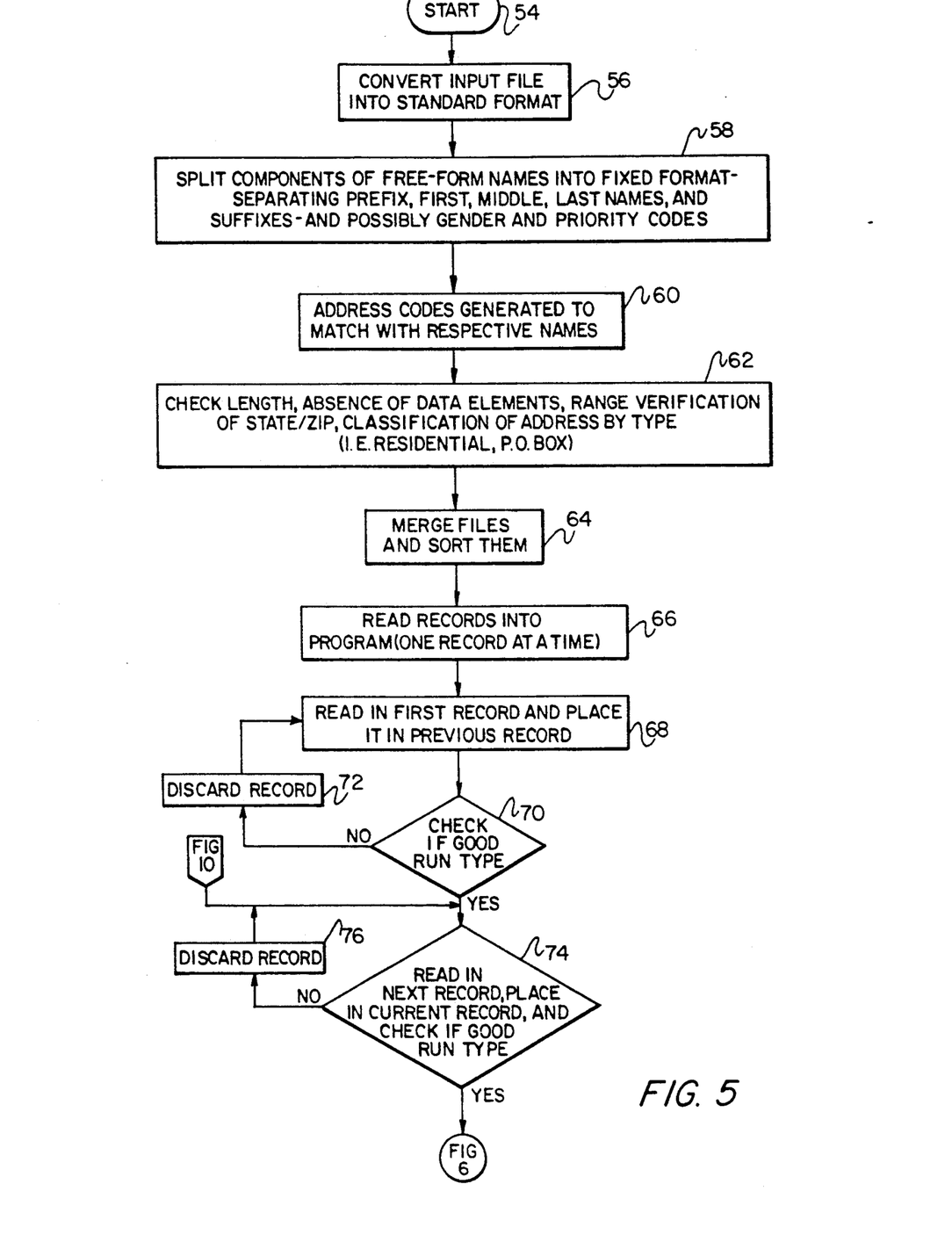
FIGS. 5-10 illustrate the flow sequence of the program of the present invention.

In a preferred embodiment of the present invention (FIG. 4), the central computer 40 is an IBM 360 or 4300 Series with a minimum of two tape drives and monitor 42 and software utilizing the standard COBOL language. Standard IBM or IBM-compatible peripherals include two 10-megabyte hard disk drives 48 and 50, a 360K floppy disk drive 52 and standard terminal 44. Printer 46 is also used for hard copy output. Operation and programming of such conventional computer hardware/software systems are well known in the art and therefore a discussion of such operating principles is not included herein.

FIGS. 5 through 10 illustrate the basic flow of the Program. The Program starts at 54 (FIG. 5) with the conversion of individual input files into a standard format at 56. An input file may consist of a listing or series of names and addresses in an arbitrary format, i.e. without any special regard to the placement or number of characters assigned to the first name, last name, etc. The conversion process involves separating, at 58, the individual components of the free-form name into a fixed format including the prefix, first name, middle initial, last name, and suffix. The fixed format can also include a gender code and, if applicable, a priority code assigned to each name (e.g. females may be assigned a higher priority for some products/services/political organizations) The converted files are then "edited" at 60 and 62. Address codes are generated to match addresses with names, data lengths are checked, presence or absence of data elements (i.e. last name) are noted, the range of the zip code for the corresponding state (e.g. VA 22001-24699) is checked and the addresses are classified by type (i.e. residential, P.O. Box, rural route, etc.) . The individual input files, having been converted into a standard format and "edited" to permit ready comparison of records, are then merged into a single file and sorted at 64 so that similar records are located next to each other in the file. These similar records will then be compared to each other by the Program of the present invention. These similar records will then be compared to each other by the Program of the present invention. Techniques for converting files, and editing and sorting records are well known in the art and therefore are not discussed in detail herein.

Preliminary steps 56-64 basically place the information (names/addresses) from various sources into a single file in a standard format. Creation of the contributor/customer list begins with step 66 wherein records from the merged file are read into the Program, one record at a time. The first record read is placed in a Program location labelled "previous record" at 68. The record is checked at 70 to determine if it is in the proper format ("good run type") and if it is not, the Program discards that record at 72 and loops back to 68 to select another record as the first record. If the first record is good, another ("next") record is read in at 74 and placed in a Program location labelled "current record". This record is also checked for proper format. If it is not good, it is discarded at 76 and another record is read in and placed in the "current record" location. It is to be understood that information is read into the Program and stored in Program locations using the computer system of FIG. 4 in a conventional manner. Computer operations including input/output (I/O) and memory storage and allocation are well known to those having ordinary skill in the computer art and therefore a discussion of such principles is not included herein.

Figure 6:
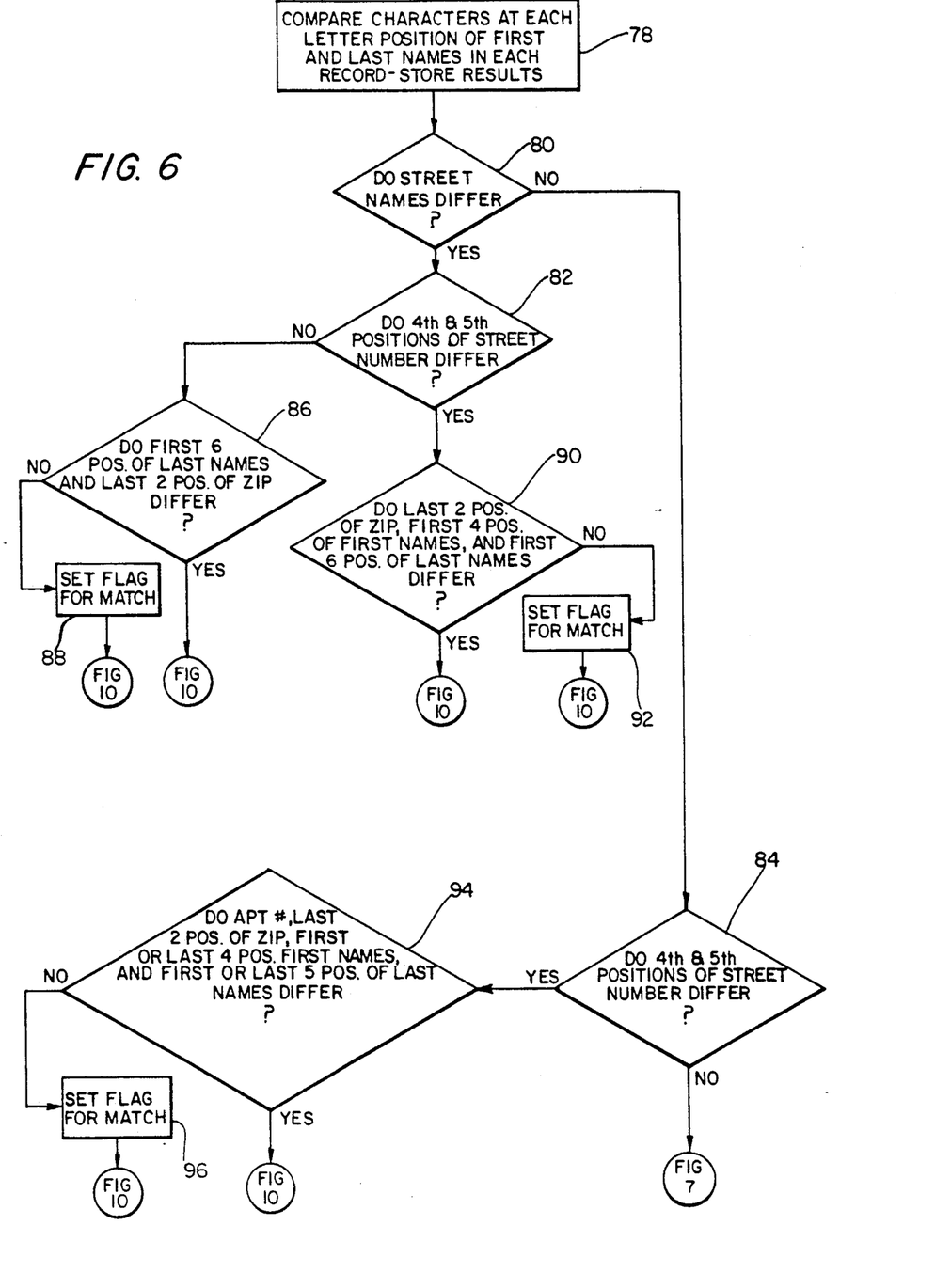

If the records stored in "previous record" and "current record" are both good, the program advances to the first comparison of the records at 78 (FIG. 6). The letters of the first and last names of each record are compared to each other and the results of such comparison are stored for use with future tests. For example, the results of comparison 78 could indicate that the first four positions of the first name of each record match but the last two positions do not match, etc. Next, the street names are compared at 80. This comparison results in two major branches of the test procedure with one branch (yes—street names differ) advancing to test 82 and the second branch (no—street names the same) advancing to test 84.

If the street names differ, test 82 compares the 4th and 5th positions of the street number. If these characters are the same, test 86 looks at the first 6 positions of the last names (results of comparison 78) and also compares the last 2 positions of the zip code. If differences are found in test 82, the program advances directly to FIG. 10. If no differences are found in test 82, a flag is set at 86 indicating a MATCH (i.e. duplicate record) and then the program advances to FIG. 10. The following example illustrates the program flow through steps 80-82-86-88 where the street names differ yet a duplicate record is still discovered:

---

STREET NAMES differ
  but:
    positions 4 and 5 of STREET NUMBERS match
    and the first 6 positions of LAST NAMES match
    and the last 2 positions of ZIP CODES match.
  Example:
    PREV REC:   MARY JOHNSON   1234 PARK   20016

---

-continued

CURR REC:   MARY JOHNSON   1234 PRAK   20016

---

Prior art systems that rely on the principle that both matchcodes (portions of the record) must be equal for one record to be a duplicate of another could not have identified the two records in the above example as duplicates.

Now referring back to FIG. 6, test 82, if the 4th and 5th characters of the street number differ, test 90 compares the last two positions of the zip code and looks at the previous results (step 78) of the comparison between records of the first 4 positions of the first names and the first 6 positions of the last names. If differences are found, the program advances immediately to FIG. 10. If no differences are found, a flag is set at 92 indicating a match and then the program advances to FIG. 10. The following illustrates the program flow through steps 80-82-90-92 where the street names differ and part of the street number differs yet a duplicate record is discovered:

---

STREET NAMES differ, plus positions 4 and 5 of STREET NUMBERS differ but:
  the first 6 positions of LAST NAMES match
  and the first 4 positions of FIRST NAMES match
  and the last 2 positions of ZIP CODES match. Example:
  PREV REC:   MARY JOHNSON   1234 PARK   20016
  CURR REC:   MARY JOHNSON   1256 PKAR   20016

---

From this point on in the program sequence, the street names must match for a duplicate record to be discovered. With the street names the same, test So branches to test 84 where the 4th and 5th positions of the street number are compared. If these street number positions differ, test 94 compares the apartment numbers (if any), the last 2 positions of the zip code, and looks at the previous results (step 78) of the comparison between records of the first or last 4 positions of the first name, and the first or last 5 positions of the last name. If differences are found, the program advances immediately to FIG. 10. If no differences are found, a flag is set at 96 indicating a match and then the program advances to FIG. 10. The following illustrates the program flow through steps 80-84-94-96 where the street numbers are different and yet a duplicate record is discovered:

---

Positions 4 and 5 of STREET NUMBERS differ but:
  STREET NAMES match
  and APARTMENT NUMBERS match
  and the last 2 positions of ZIP CODES match
  and the first 4 or last 4 positions of FIRST NAMES match
  and the first 5 or last 5 positions of LAST NAMES match. Example:
  PREV REC   MARY JOHNSON    1234 PARK #24   20016
  CURR REC:  MARY JOHNSTON   1256 PARK #24   20016

---

The example above illustrates that even though the street numbers differ and the last name may be misspelled in one record, a duplicate record will still be discovered.

Figure 7:
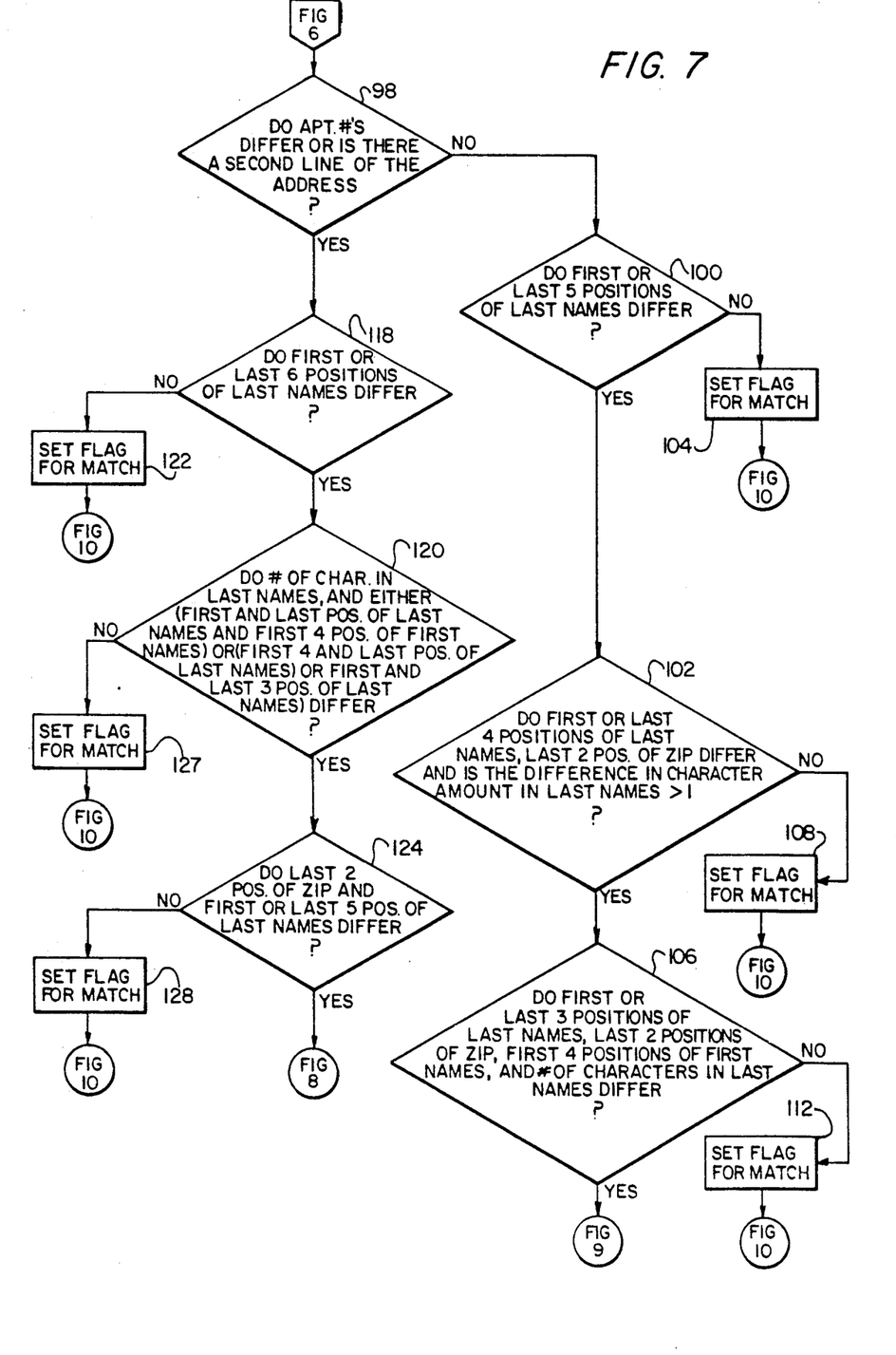

All further tests in the program require that the street names and numbers match for a duplicate record to be discovered. With the street names and numbers the same, test 84 branches to test 98 (FIG. 7).

Test 98 compares the records to determine if their apartment numbers differ or if one of the records contains a second address line. If there is no difference in apartment numbers and no second address line the program continues to test 100. Test 100 looks at the previous results (step 78) of the comparison between records of the first or last 5 positions of the last names. If differences are found the program advances to test 102. If no differences are found, a flag is set at 104 indicating a match and then the program advances to FIG. 10. The following illustrates the program flow through steps 80-84-98-100 where the street names, numbers and apartment numbers (if any) match and at least a portion of the last names are the same. It should be noted in the following example that even though one record may contain errors in the zip code, or a hyphenated last name, a duplicate record is still discovered:

---
STREET NAMES, NUMBERS and APT # match
and
the first 5 or last 5 positions of LAST NAMES match.
Example:
PREV REC: MARY JOHNSON        1234 PARK #24    20016
CURR REC: MARY JOHNSON-JONES  1234 PARK #24    20073

---

Test 100 branches to test 102 if the first or last 5 positions of the last name differ. Test 102 looks to see if the first 4 or last 4 positions of the last name match and also if the last 2 positions of the zip code match, and also if the number of characters in the last names differ by 1 or less. If differences are found in this test, the program proceeds to test 106. If the differences tested for are not found, a flag is set at 108 indicating a match and the program proceeds to FIG. 10. The following illustrates the program flow through steps 80-84-98-100-102 where the street names, numbers and apartment numbers (if any) match and at least a portion of the last names (smaller portion than that identified in test 100) match, a portion of the zip code matches and the difference in the number of characters in the last names is 1 or less. It should be noted in the following example that even though in one record two letters in the last name may have been transposed and one letter dropped off, a duplicate record is still discovered:

---
STREET NAMES, NUMBERS AND APT # match
and the last 2 positions of ZIP CODE match
and first 4 or last 4 positions of LAST NAMES match
and the number of characters in LAST NAMES differs by 1 or less. Example:
PREV REC:   MARY JOHNSON   1234 PARK #24   20016
CURR REC:   MARY HONSON    1234 PARK #24   20016

---

Figure 9:
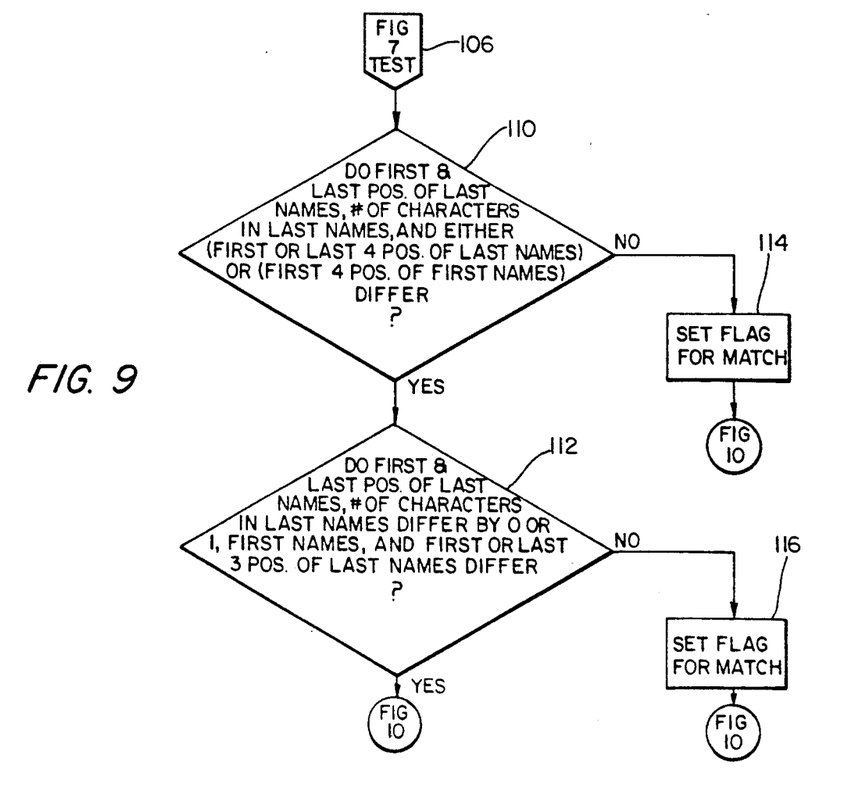
Figure 10:
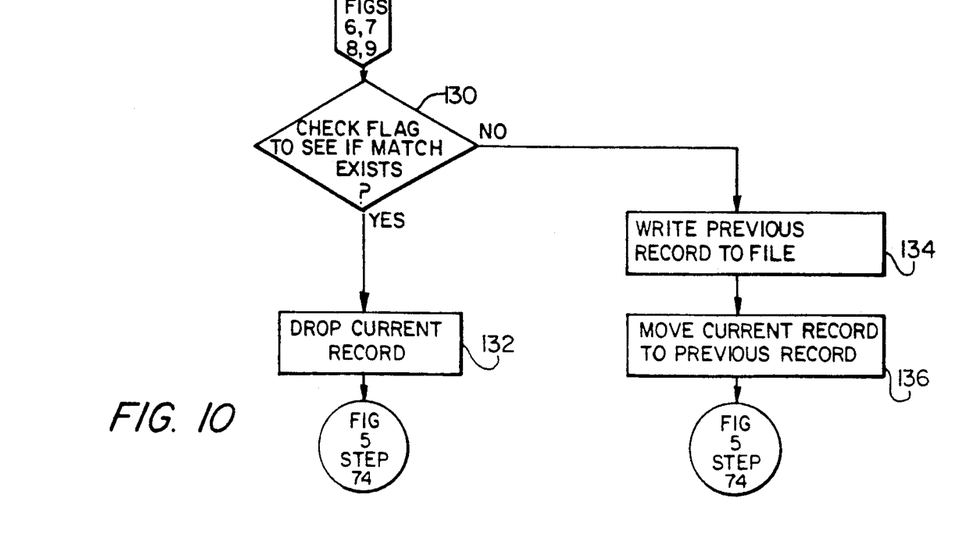

Test 102 branches to test 106 if a match is not found. Test 106 looks at only the first or last 3 positions of the last name (rather than 4 or 5 of previous tests) and also the last 2 positions of the zip code, the first four positions of the first names, and checks to see if the number of characters in the last names differs. If the differences tested for are found the program proceeds to test 110 (FIG. 9). If the differences tested for are not found, a flag is set at 112 indicating a match and the program proceeds to FIG. 10. The following illustrates the program flow through steps 80-84-98-100-102-106 where only three positions of the last name match but a duplicate record is still discovered.

---
STREET NAMES, NUMBERS and APT # match
and the first 3 or last 3 positions of LAST NAMES match
and the last 2 positions of ZIP CODE match
and the first 4 positions of FIRST NAMES match
and the number of characters in LAST NAMES match. Example:
PREV REC:   MARY JOHNSON   1234 PARK #24   20016
CURR REC:   MARY TONHSON   1234 PARK #24   20016

---

Test 106 branches to test 110 (FIG. 9) if a match is not found. The match criteria for test 106 are comparisons of the first and last positions of last names, the number of characters in the last names, and either the first or last 4 positions of the last name or the first 4 positions of the first name. If a match is found using the criteria of test 110, the match flag is set at 114 and the program proceeds to FIG. 10. If not, the program continues to test 112. The following illustrates the program flow through steps 80-84-98-100-102-106-110. Again, differences in the last name or errors in the zip code will not necessarily prevent a duplicate from being found.

---
STREET NAMES, NUMBERS and APT # match
and the first and last position of LAST NAMES match
and the number of characters in LAST NAMES match
and either the first 4 or last 4 positions of LAST NAMES match or the first 4 positions of FIRST NAMES match.
Example:
PREV REC:   MARY JOHNSON   1234 PARK #24   20016
CURR REC:   MARY JONHSON   1234 PARK #24   200XX

---

Test 110 branches to test 112 if a match is not found. The match criteria for test 112 are comparisons between records of the first and last positions of the last names, the number of characters in the last name (must differ by 1 or less), the first names (all positions), and the first 3 or last 3 positions of the last names. If a match is found using the criteria of test 112, the match flag is set at 116 and the program proceeds to FIG. 10. If not, the program proceeds directly to FIG. 10. The following illustrates the program flow through steps 80-84-98-100-102-106-110-112. Once again, differences in the last name or differences in the zip code will not necessarily prevent a duplicate from being found.

---
STREET NAMES, NUMBERS and APT # match
and the first and last positions of LAST NAMES match
and the number of characters in LAST NAMES differ by 1 or less
and the FIRST NAMES match
and the first 3 or last 3 positions of LAST NAMES match.
Example:
PREV REC:   MARY JOHNSON   1234 PARK #24   20016
CURR REC:   MARY JHONSSON  1234 PARK #24   200XX

---

This ends the series of tests where the apartment numbers match or there is no second address line. Referring now back to test 98 (FIG. 7), if the apartment numbers differ or if there is a second address line, the program advances to test 118. Test 118 looks at the first or last 6 positions of the last names. If they match, then the match flag is set at 122 and the program proceeds to FIG. 10. If a difference is found the program proceeds to test 120. The following illustrates the program flow through steps 80-84-98-118. The example illustrates that even if the apartment numbers do not match and only portions of the names match, a duplicate can still be identified.

STREET NAMES and NUMBERS match
and the first 6 or last 6 positions of LAST NAMES match
but APT #'s differ. Example:
PREV   MARY JOHNSON         1234 PARK       20016
REC:
CURR   MARY JOHNSON-JONES   1234 PARK #24 200XX
REC:

If the first or last 6 positions of the last names differ then the program proceeds to test 120. In test 120, a duplicate is found if the number of characters in the last names match and one of the following conditions is also true: (1) the first and last positions of the last names match and the first 4 positions of the first name match, or (2) the first 4 positions and last 1 position of the last names match, or (3) the first 3 and last 3 positions of the last name match. If a match is found, the match flag is set at 127 and the program proceeds to FIG. 10. If not, the program proceeds to test 124. The following illustrates the program flow through steps 80-84-98-118-120. The example illustrates another instance where the apartment numbers do not match and only portions of the names match but a duplicate can be identified.

Figure 8:
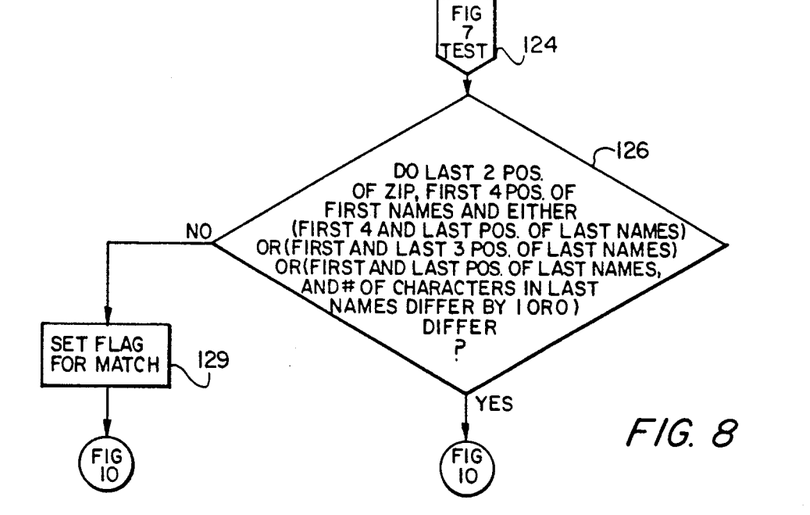

STREET NAMES and NUMBERS match
and the number of characters in LAST NAMES match but the
APT #'s differ and either:
    the first and last positions of LAST NAMES match
        and first 4 positions of FIRST NAMES match
    or the first 4 positions and last 1 position of LAST
        NAMES match
    or the first 3 and last 3 positions of LAST NAMES
match. Example:
PREV REC:   MARY JOHNSON   1234 PARK       20016
CURR REC:   MARY JOHNTON   1234 PARK #24  200XX If the conditions of test 120 do not identify a duplicate record, the program proceeds to test 124 which compares the last 2 positions of the zip codes and the first or last 5 positions of the last names. If a match is found the match flag is set at 128 and the program proceeds to FIG. 10. If not, the program proceeds to test 126 (FIG. 8). The following illustrates the program flow through steps 80-84-98-118-120-124.

STREET NAMES and NUMBERS match
APT #'s differ and the last 2 positions of ZIP CODES match
    and either the first 5 or last 5 positions of LAST NAMES
    match.
Example:
PREV   MARY JOHNSON         1234 PARK       20016
REC:
CURR   MARY JOHNSON-JONES   1234 PARK #24  20016
REC:

If no match is found by test 124, then the program proceeds to test 126 (FIG. 8) for the final check for a duplicate record. In test 126, a duplicate is found if the last 2 positions of the zip code match and the first 4 positions of the first names match, and one of the following conditions is also true: (1) the first 4 positions and last 1 position of the last names match, or (2) the first and last 3 positions of the last names match, or (3) the first and last positions of the last names match and the number of characters in the last names differ by 1 or less. If a match is found, the match flag is set at 129 and the program proceeds to FIG. 10. If not, the program proceeds directly to FIG. 10. The following illustrates the program flow through steps 80-84-98-118-120-124-126.

STREET NAMES and NUMBERS match
and the last 2 positions of ZIP CODE match and the first 4
    positions of FIRST NAMES match
and either:
    the first 4 positions and last 1 position of LAST NAMES
        match
    or the first 3 and last 3 positions of LAST NAMES
        match or the first and last positions of LAST NAMES
        match and the number of characters in LAST NAMES
        differs by 1 or less. Example:
PREV REC:   MARY JOHNSON    1234 PARK       20016
CURR REC:   MARY JOHNSOON   1234 PARK #24  20016

As is evident from the above discussion of the flow of the merge/purge Program of the present invention, the number and types of comparisons and tests on the two records of interest vary dynamically. The Program of the present invention automatically decides which tests and how many tests will be made to determine the presence of a duplicate record, depending upon the characteristics of the two particular records being tested at the time (e.g. presence or absence of apartment number). All tests terminate in the Program steps shown in FIG. 10. At step 130, the "match flag" is checked to see if it has been set by any of the previous tests. As is conventional, a "flag" is a memory location (usually one bit) that can be set or cleared to indicate the occurrence of an event. If any of the tests (e.g. 86, 90, 94, etc.) identified a duplicate record, the match flag will be set, indicating a match exists between sufficient portions of the two records. If a duplicate record has been detected, the current record is dropped (e.g. data is cleared from the memory location assigned to "current record") at step 132. The Program sequence then returns to step 74 (FIG. 5) where a new record (i.e. new name, address, etc.) is read into the current record location. The Program sequence described above is then repeated to see if this new name, address, etc. matches the name, address, etc. stored in the previous record location. The Program will continue in this manner until a unique record is found (i.e. one that does not match the previous record).

If, at step 130, the flag was not set by any of the tests then the names and addresses stored in "previous record" and "current record" were not found to be duplicates. In this instance, the name/address stored in previous record is written at step 134 to an output file, which, for example, will store the contributor/customer list. The name/address in the current record location is moved to the previous record location at step 136, thus becoming the name/address against which new records will be compared. The Program sequence then returns to step 74 (FIG. 5) where a new name/address is read into the current record location. The Program sequence described above is then repeated to see if this new name/address is a duplicate.

The Program continues through the input file, discarding duplicate names/addresses and storing unique names/addresses in the output file. This output file will become the contributor/customer list used in the solicitation program described previously. As will be appreciated, the merge/purge Program of the present invention is far more effective at identifying duplicates than prior art programs. All data elements within the match-code need not match in the present invention since individual data elements are compared independently with the testing sequence changing dynamically. As long as the set of criteria in one of the test sequences is satisfied, a duplicate is identified. Thus, even though certain portions of the name and address are different, as long as certain other significant portions match, it is highly probable that the records identify the same person. The present invention takes advantage of this high probability to ensure that only one bank draft is sent out to each person, thus ensuring an effective and successful solicitation campaign.

The present invention has been described in terms of certain preferred or exemplary embodiments. However, those having skill in the art will understand that the invention may be practiced with many changes and modifications. All such modifications or enhancements are intended to be within the scope of the present invention as defined by the following claims.

I claim:

1. A method of creating lists comprising the steps of:
   creating a file, said file comprising a plurality of records, each record including a name and address of an individual,
   selecting portions of each record,
   making a first comparison between a first predetermined portion of a first record and a first predetermined portion of at least one second record to determine if said first portions match,
   if said first portions do not match, making a subsequent comparison between a second predetermined portion of said first record and a second predetermined portion of said at least one second record to determine if said second portions match,
   if said first portions do match, making a subsequent comparison between a third predetermined portion of said first record and a third predetermined portion of said at least one second record to determine if said third portions match,
   identifying at least one duplicate record in said file when a predetermined combination of said first, second, and third portions match,
   eliminating identified duplicate records from said file and creating a second file of unique records, wherein no two unique records identify the same individual,
   creating a list of individuals from said second file of unique records, and
   wherein if said first and subsequent comparisons do not identify a duplicate record, the steps of making a number of additional comparisons between additional predetermined portions of said first record and said at least one second record until a duplicate record is identified or until said additional comparisons are complete, and
   wherein said number of rotational comparisons are performed in one of a plurality of sequences, a particular sequence being selected in accordance with the results of said first, subsequent and additional comparisons.

2. A method according to claim 1 wherein said first predetermined portions of said first record and said at least one second record comprise street names.

3. A method according to claim 1 wherein said second predetermined portions of said first record and said at least one second record comprise street numbers.

4. A method according to claim 1 wherein said additional predetermined portions include said first and last names, zip codes, and apartment numbers.

5. Apparatus for creating lists comprising:
   means for creating a file, said file comprising a plurality of records, each record including a name and address of an individual,
   means for selecting portions of each record,
   means for making a first comparison between a first predetermined portion of a first record and a first predetermined portion of at least one second record to determine if said first portions match,
   means for making a subsequent comparison, if said first portions do not match, between a second predetermined portion of said first record and a second predetermined portion of said at least one second record to determine if said second portions match,
   means for making a subsequent comparison, if said first portions do match, between a third predetermined portion of said first record and a third predetermined portion of said at least one second record to determine if said third portions match,
   means for identifying at least one duplicate record in said file when a predetermined combination of said first, second and third portions match,
   means for eliminating identified duplicate records from said file and means for creating a second file of unique records, wherein no two records identify the same individual,
   means for creating a list of individuals from said second file of unique records, and further including
   means for making a number of additional comparisons between additional predetermined portions of said first record and said at least one second record until a duplicate record is identified or until said additional comparisons are complete, and wherein said number of additional comparisons are performed in one of a plurality of sequences, a particular sequence being selected in accordance with the results of said first, subsequent and additional comparisons.

6. Apparatus according to claim 5 wherein said first predetermined portions of said first record and said at least one second record comprise street names.

7. Apparatus according to claim 5 wherein said second predetermined portions of said first record and said at least one second record comprise street numbers.

8. Apparatus according to claim 5 wherein said additional predetermined portions include said first and last names, zip codes, and apartment numbers.

* * * * *

UNITED STATES PATENT AND TRADEMARK OFFICE
CERTIFICATE OF CORRECTION

PATENT NO.   :   5,303,149
DATED        :   April 12, 1994
INVENTOR(S)  :   Paul C. Janigian It is certified that error appears in the above-identified patent and that said Letters Patent is hereby corrected as shown below:

Col. 13, line 54, delete "rotational" and insert -- additional --.

Signed and Sealed this

Sixth Day of September, 1994

Attest:

BRUCE LEHMAN

*Attesting Officer*     *Commissioner of Patents and Trademarks*